July 26, 1938.　　　P. E. YANCEY　　　2,125,141
WASTE RETAINER FOR CAR JOURNALS
Filed Nov. 5, 1936
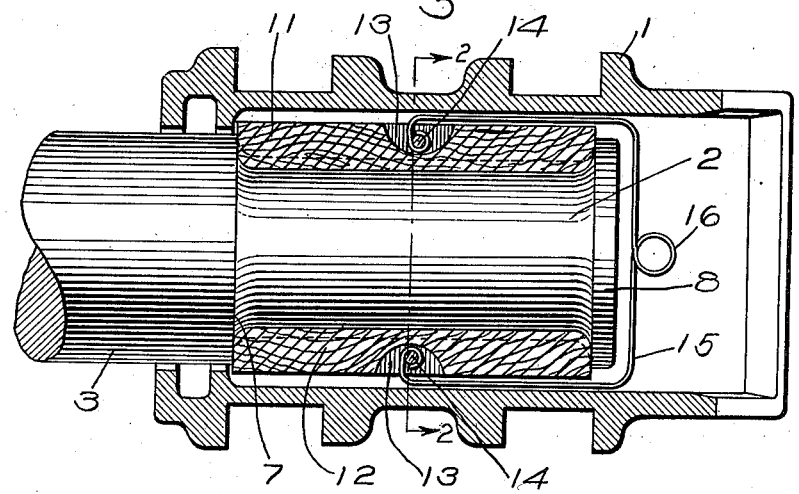
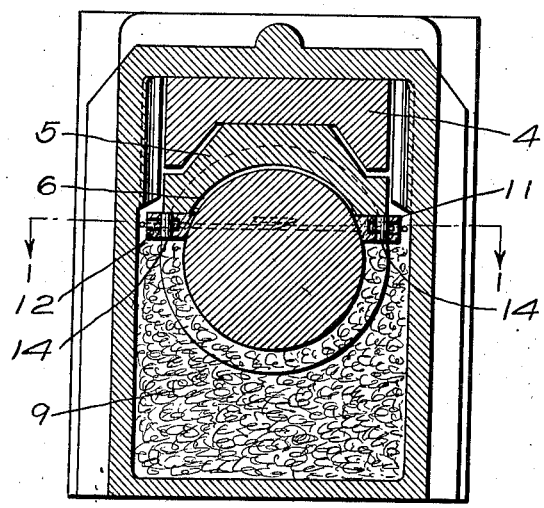
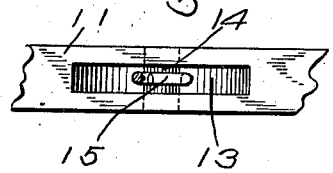
INVENTOR
PERRY E. YANCEY
BY *Wm. M. Cady*
ATTORNEY Patented July 26, 1938

2,125,141

UNITED STATES PATENT OFFICE 2,125,141

WASTE RETAINER FOR CAR JOURNALS

Perry E. Yancey, Chicago, Ill., assignor to The Westinghouse Air Brake Company, Wilmerding, Pa., a corporation of Pennsylvania Application November 5, 1936, Serial No. 109,269

3 Claims. (Cl. 308—89)

This invention relates to waste retainers for car journals that are adapted for use on railway cars.

In order to maintain proper lubrication of the journals of railway car axles and prevent hot boxes it is usual to provide journal boxes about the journals containing waste packing material that is kept saturated with oil. It is desirable to keep the journal box sufficiently filled with oil soaked packing to maintain continuous contact between the packing and the journal.

There is a tendency, especially in cold weather, for the journal to "grab" the congealed oil soaked waste packing and carry particles thereof with the journal under the bearing, thereby forming rough or raised spots on the journal surface which may cause undue pressure against and wearing of the bearings with the possibility of producing a hot box and causing damage and delay.

It is an object of my invention to provide means for preventing grabbing of the packing that is held in contact with the car journal.

It is a more specific object of my invention to provide means for scraping or wiping the journal surface to remove any particles of packing adhering to the journal surface prior to its passage under the journal bearing.

In the drawing Fig. 1 represents a horizontal sectional view of a journal box taken along the line 1—1 of Fig. 2 to which my invention is applied.

Fig. 2 is a vertical sectional view taken along the line 2—2 of Fig. 1 and

Fig. 3 is a detail view.

Referring to the drawing, a journal box 1 is provided carried on the side frame of the car truck in a well known manner and inclosing a journal 2 of a car axle 3. Within the journal box and under the upper wall thereof an equalizing wedge 4 is provided which rests on the cylindrical brass 5, the lower surface of which is cylindrical in form to accommodate the bearing 6 that is in contact with the journal 2. The brass 5 and bearing 6 extend from the shoulder 7 on the axle to the journal collar 8 on the upper side of the journal 2, and space is provided within the journal box on the under side of the journal for accommodating waste packing 9 of a well known character. This waste is soaked with lubricating oil and the space below the journal is sufficiently well filled that the oil soaked waste effects a continuous supply of lubricant to the under side of the journal.

In accordance with my invention packing grab knives or scraping members 11 and 12 are provided under the brass 5 on the opposite sides of the journal 2 and are so arranged as to engage the surface of journal for its entire length between the shoulder 7 and the collar 8. Recesses 13 are provided on the outer sides of the scraping members 11 and 12 through which pins 14 extend to accommodate the ends of a spring or biasing member 15 having a loop 16 for urging the scraping members 11 and 12 inwardly toward the journal to maintain a desired pressure thereagainst so as to form a continuous scraping action to remove from the surface of the journal any particles of waste that may have been "grabbed" by the journal and adhered to it during its rotative movement. The members 11 and 12 thus remove any waste particles from the surface of the journal and prevent their being drawn between the journal and the bearing 6, which when so drawn has the effect of producing small raised points on the surface of the journal that cause undue pressure and wearing of the bearing surface and heating thereof.

The scraping members or packing grab knives 11 and 12 are preferably made of wood, or other non-metallic material to prevent scoring the journal.

It will be apparent to those skilled in the art that many modifications may be made in the apparatus disclosed without departing from the spirit of my invention and I do not wish to be limited otherwise than by the scope of the appended claims.

Having now described my invention, what I claim as new and desire to secure by Letters Patent, is:

1. The combination with a car axle journal box having a journal therein and having a journal bearing in the upper part thereof resting upon said journal and extending around said journal a portion only of the distance to the horizontal plane extending through the axis of said journal, the lower portion of said journal box being adapted to contain oil soaked packing engaging the lower portion of said journal, a pair of scraper members extending lengthwise of said journal and adapted to engage the surface of said journal to remove packing adhering thereto, said members being arranged one at each side of the journal bearing and being adapted to engage the lower faces thereof, and a spring connected with said members at points substantially mid-way between the ends thereof, the spring extending substantially parallel to the axis of said journal and yieldingly pressing said members into engagement with the surface of said journal.

2. The combination with a car axle journal box having an end of a car axle extending thereinto, said axle end having a journal thereon, the journal box having a journal bearing mounted therein resting upon said journal and extending around said journal a portion only of the distance to the horizontal plane extending through the axis of the journal, the lower portion of said journal box being adapted to contain oil soaked packing engaging the lower portion of said journal, a pair of scraper members extending lengthwise of said journal and engaging the surface of said journal to remove packing adhering thereto, said members being arranged one at each side of the journal bearing and engaging the lower faces thereof, and a spring for pressing said members against said journal, said spring comprising a substantially U-shaped element arranged in a plane generally parallel to the axis of said journal and having arms connected with the scraper members at points substantially mid-way between the ends of said members, the arms of said spring being joined by a portion extending across the end of said car axle.

3. A waste retainer for use with a car axle journal box having the end of a car axle extending thereinto and having a journal bearing mounted therein and resting upon a journal formed on the end portion of said car axle, the journal bearing extending around said journal a portion only of the distance to the horizontal plane extending through the axis of said journal, the lower portion of said journal box containing oil soaked packing engaging the lower portion of said journal, the waste retainer comprising a pair of scraper members adapted to be arranged one at each side of the journal bearing in engagement with the lower faces thereof, said scraper members being adapted to engage the surface of said journal to remove packing adhering thereto, and a substantially U-shaped spring for pressing said scraper members against the surface of said journal, said spring having spaced substantially parallel arms extending substantially parallel to the axis of said journal and joined by a portion extending around the end of said car axle, each of the arms of said spring having an end connected to one of said scraper members at a point substantially midway between the ends of said scraper member for pressing said scraper member against said journal.

PERRY E. YANCEY.